United States Patent Office 2,744,149
Patented May 1, 1956

2,744,149

PREPARATION OF m- AND p-CYMENE MIXTURE BY ISOMERIZATION OF CYMENE

Herman I. Enos, Jr., Wilmington, Del., assignor to Hercules Powder Company, Wilmington, Del., a corporation of Delaware No Drawing. Application June 29, 1953, Serial No. 364,967

7 Claims. (Cl. 260—668)

This invention relates to the isomerization of cymene isomers and more particularly to the production of an isomerized mixture rich in m- and p-cymenes by isomerization of cymene isomers.

Cymenes are valuable raw materials for conversion into other products such as the hydroperoxides, the cresols and dibasic acids such as terephthalic and isophthalic acids. The only cymene isomer readily available in the pure form for this purpose is p-cymene which can be produced easily by dehydrogenation of terpenes. Cymenes have been produced synthetically, for instance, by propylation of toluene. However, by prior art processes, mixtures are produced which are not separable into pure components and are not useful for producing pure products. For instance, prior art cymene mixtures, on oxidation to hydroperoxides followed by acid catalyzed cleavage to cresols, lead to mixtures of cresols which are not separable into individual cresol isomers. Moreover, prior art mixtures of cymenes are rich in o-cymene which interferes with liquid phase oxidation for production of terephthalic acid.

Now in accordance with this invention it has been found that a mixture of cymene isomers substantially free of o-cymene and which is free of the objections to prior art synthetic cymene is produced by contacting a cymene with 0.1 to 2 mole per cent aluminum chloride at 80°–150° C. under isomerizing conditions until the mixture contains m- and p-cymene and less than about 5% o-cymene, and separating the mixture from the catalyst.

The process of this invention provides an isomerization step which is particularly useful in the production of a mixture of m- and p-cymene hydroperoxides from which a mixture m- and p-cresols, separable into individual cresols, is readily obtained. Such a mixture of m- and p-cymene hydroperoxides is produced by contacting a mixture of o-, m-, and p-cymenes in which the o-cymene content is less than 10% with elementary oxygen under hydroperoxide-forming conditions until a hydroperoxide content not exceeding about 35% is attained, such that the ratio of o-cymene in the mixture to the total unreacted cymene does not exceed 10%, separating the m- and p-cymene hydroperoxides from the unreacted cymene, and isomerizing the unreacted cymene enriched in o-cymene by contacting it with 0.1–2 mole per cent aluminum chloride at 80°–150° C. under isomerizing conditions until the o-cymene content is reduced to less than about 5% and recycling the isomerized cymene to the oxidation step.

A process of oxidation to hydroperoxides in which the present invention is incorporated is represented by the following flow sheet:

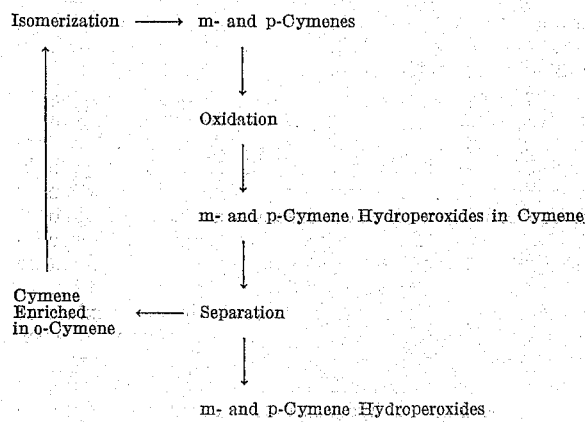

The isomerization is carried out by heating the cymene with powdered anhydrous aluminum chloride. The aluminum chloride is, for instance, added to the cymene at low temperature and the temperature is raised to the range of 80°–150° C. until the isomerization is essentially complete and the o-cymene content is reduced to substantially less than 10%, preferably about 2–4%. The isomerization mixture is freed of catalyst by centrifuging or filtering out the catalyst or the reaction mixture is drowned with water containing acid or alkali to dissolve the aluminum chloride by pouring the reaction mixture directly into water, or the isomerization mixture is inactivated by adding water to the isomerization mixture at about 80° C. so as to maintain the low concentration of o-cymene attained in the isomerization. The isomerized cymene is worked up in the usual manner for working up products from Friedel-Crafts reactions.

The isomerization process of this invention may be carried out on any of the cymene isomers which it is desired to convert to a mixture substantially free of o-cymene. When o-, m-, or p-cymene is isomerized by heating with 0.75 mole per cent anhydrous aluminum chloride for about 60 minutes at 100°–126° C. the isomerization mixture consists of 19 mole per cent toluene, 58 mole per cent cymene, 22 mole per cent diisopropyltoluene, and the cymene consists of 2.9–3.8% o-cymene, 65–68% m-cymene, and 29–32% p-cymene. The toluene and diisopropyltoluene are generally returned to the isomerization system so as to avoid loss due to these by-products of the isomerization equilibrium.

The aluminum chloride used as a catalyst in the isomerization step of this invention is anhydrous aluminum chloride. It is used in an amount in the range of 0.1 to 2 mole per cent based on the moles aromatic, i. e., benzenoid products in the reaction mixture. It is preferably used in the range of 0.3 to 0.8 mole per cent.

The temperature of the reaction mixture in the isomerization step is any temperature in the range of 80°–150° C. The preferred temperature range is 85°–115° C.

In carrying out the process of this invention, the lower concentration of aluminum chloride catalyst in the range set forth is used with the higher temperature in the range set forth, and the higher concentration of aluminum chloride catalyst in the range set forth is used with the lower temperature in the range set forth. Thus, 0.1 mole per cent aluminum chloride used at a reaction temperature of 150° C. and 2 mole per cent aluminum chloride used at a reaction temperature of 80° C. will produce in either case a mixture rich in m- and p-cymene and substantially free of o-cymene.

The time of contact with the aluminum chloride at the reaction temperature is that required to give a cymene mixture containing less than about 5% o-cymene. This takes less than one hour at about 100° C. The o-cymene content is readily determined during the course of a pilot run at a selected temperature by infrared analyses on snap samples. The o-cymene content is preferably brought down to about 2–4% which appears to be the minimum o-cymene content attainable at about 100° C. and the time of reaction is preferably that necessary to attain about 2–4% o-cymene in the mixture.

The process of oxidation to hydroperoxides as set forth above is suitably carried out by contacting an isomerized cymene containing about 3% o-cymene, 65% m-cymene, and 32% p-cymene with molecular oxygen in the presence of a free radical forming initiator under hydroperoxide-forming conditions to a conversion of about 30%. The unreacted cymene in the mixture then consists of about 4.3% o-cymene. The oxidation mixture is subjected to separation of the m- and p-cymene hydroperoxides by caustic extraction of the hydroperoxides or by distillation with or without steam to remove unreacted hydrocarbon. The caustic extraction is carried out by contacting the mixture with a 3% solution of sodium hydroxide, and the hydroperoxides are recovered therefrom by hydrolysis. The unreacted cymene is again subjected to oxidation to the extent of 30% conversion to hydroperoxides. The hydroperoxides in the partially oxidized cymene are then subjected to extraction with aqueous sodium hydroxide solution and are separated from the unreacted cymene. The unreacted cymene contains about 6.8% o-cymene. While the recovered cymene can be recycled directly to the oxidation process as long as it contains less than 10% o-cymene, it is preferable to isomerize cymene containing more than about 6.5% o-cymene so as to reduce the o-cymene content to about 3% o-cymene by adding 0.1–2 mole per cent anhydrous aluminum chloride to the cymene and heating to about 80°–150° C. until the o-cymene content is reduced to about 3%. The isomerized cymene is recovered and recycled to the oxidation process.

The oxidation process whereby the m- and p-cymenes are selectively oxidized in the mixture containing less than 10% o-cymene to a mixture of m- and p-cymene hydroperoxides in admixture with unreacted cymene enriched percentagewise in o-cymene as a result of conversion of the m- and p-cymenes to the hydroperoxides is carried out by contacting the cymene mixture with molecular oxygen under hydroperoxide-forming conditions, preferably in the presence of a catalyst of the free radical former type as an initiator for the reaction and the process is continued until a conversion of up to about 35% hydroperoxide in the mixture is reached, the maximum conversion being such that the unreacted cymene in the mixture does not exceed 10% in o-cymene content.

The oxidation under hydroperoxide-forming conditions is carried out in either aqueous or anhydrous systems in the absence of acid-acting substances and it is preferably carried out in the presence of alkaline-acting materials capable of neutralizing any acid-acting substances. Further details as to the manner of carrying out suitable oxidation processes are disclosed in U. S. 2,548,435, U. S. 2,547,938, U. S. 2,628,983, U. S. 2,628,984, U. S. 2,632,774 and U. S. 2,632,026.

The extent to which the conversion of the cymene to cymene hydroperoxide is carried out in the oxidation process is the critical part of the oxidation process and this depends, as pointed out above, on the amount of o-cymene in the cymene mixture; but, the oxidation is carried out to a maximum conversion of about 35% even when the o-cymene in the cymene being oxidized is less than 6.5%. When a cymene containing more than 6.5% o-cymene is oxidized, the maximum conversion is less than about 35% to avoid carrying out the oxidation on a cymene mixture in which the cymene is 10% o-cymene. It is preferred that the conversion be carried no further than that at which the residual cymene contains less than about 7.5% cymene.

In the oxidation process the conversion per pass generally is kept below about 35% or that which leaves an unreacted cymene containing not more than 10% o-cymene, whichever conversion percentage is the lower. For instance, cymene containing 8% o-cymene is carried to a conversion of only 20% hydroperoxide because at that level the o-cymene content of the unreacted cymene is 10%. Similarly, cymene containing 9% o-cymene is oxidized to only 10% conversion. Oxidation of a mixture of cymenes containing 10% or more o-cymene introduces o-cymene hydroperoxide into the product in such amounts as to cause the hydroperoxide mixture to contain an objectionable amount of o-cymene hydroperoxide.

The hydroperoxides are separated from the unreacted cymene by stripping of the unreacted cymene by distillation or by extracting the hydroperoxides by caustic. The distillation may be dry distillation or steam distillation and may be carried out at ordinary or reduced pressures.

The caustic extraction of the hydroperoxides from the partially oxidized cymene to separate the m- and p-cymenes therefrom is accomplished with any aqueous caustic solution containing 1–10% alkali metal hydroxide, preferably sodium hydroxide. The aqueous sodium hydroxide may contain small amounts of methanol to aid in the extraction, if desired, since the methanol helps remove the hydroperoxides when the more dilute aqueous solutions of sodium hydroxide are used. It is preferable to use water as the only solvent, however.

The caustic extraction step is coordinated with the oxidation step in several ways. The extraction may be intermittent or continuous. For instance, the oxidation may be continued until there is 25–35% conversion to hydroperoxides and the oxidation mixture can then be subjected to extraction to remove part or substantially all of the hydroperoxides, and the unreacted cymene, if still sufficiently low in o-cymene content, can be returned to the oxidation process. On the other hand, if the o-cymene content is too high, the unreacted cymene can be completely freed of hydroperoxides and can be isomerized for recycle to the oxidation step.

It is particularly advantageous to carry out the caustic extraction continuously. In doing this the oxidation mixture is allowed to build up a suitable hydroperoxide content in the range of 5–10% and part of the mixture is continuously withdrawn and extracted with aqueous caustic. The caustic soda is continuously freed of cymene hydroperoxides. The caustic solution may be recycled. The cymene freed of hydroperoxides by the caustic extraction is recycled to the oxidation process. However, when the o-cymene content of the recovered cymene is built up to a selected maximum below 10%, for instance, 7.5%, the cymene is only in part recycled and part is passed to the isomerization step. The relative amounts recycled to the oxidation and to the isomerization depend upon the amount of o-cymene in the mixture. The higher the o-cymene content, the greater the proportion that is subjected to isomerization and the smaller the proportion that is recycled. Moreover, if the conversion of the cymene to hydroperoxide is low and the hydroperoxide content is maintained low, e. g., 5%, the o-cymene content in the unreacted cymene may be allowed to rise to the range of 7.5–10%, and the proportion recycled to the oxidation will be low and a substantial proportion can economically be withdrawn and isomerized before being returned to the oxidation cycle.

In the oxidation of a mixture of cymenes to isophthalic and terephthalic acid, the cymene is oxidized, for instance, by passing air into a rapidly stirred cymene mixture containing 2% manganese naphthenate as a catalyst at about 175° C. under reflux. The isophthalic and terephthalic acids which separate from the solution are withdrawn continuously or intermittently by centrifuging or filtering. Phthalic anhydride which forms tends to accumulate in the hydrocarbon phase. When isophthalic and terephthalic acids are the desired acids, it is accordingly particularly desirable to use a feed stock that is as low in o-cymene as possible. The present invention provides such a feed stock by isomerization of cymene isomers which are other than the desired isomer. For instance, m-cymene can be produced in admixture with p-cymene from o-cymene or p-cymene or mixtures and from synthetic mixtures containing more o-cymene than is desired.

Unless otherwise indicated herein all percentages are by weight.

What I claim and desire to protect by Letters Patent is:

1. The process for the production of a mixture of o-, m-, and p-cymene in which the o-cymene content is less than about 5% which comprises subjecting a cymene to contact with 0.1–2 mole per cent aluminum chloride, based on the moles benzenoid materials in the reaction mixture at 80°–150° C. under isomerizing conditions until the isomerized cymene mixture contains essentially m- and p-cymene and less than about 5% o-cymene based on the total cymene content and separating the mixture from the catalyst.

2. The process for the production of a mixture of o-, m-, and p-cymene in which the o-cymene content is less than about 5% which comprises subjecting p-cymene to contact with 0.1–2 mole per cent aluminum chloride, based on the moles benzenoid materials in the reaction mixture at 80°–150° C. under isomerizing conditions until the isomerized cymene mixture contains essentially m- and p-cymene and less than about 5% o-cymene based on the total cymene content and separating the mixture from the catalyst.

3. The process for the production of a mixture of o-, m-, and p-cymene in which the o-cymene content is less than about 5% which comprises subjecting m-cymene to contact with 0.1–2 mole per cent aluminum chloride, based on the moles benzenoid materials in the reaction mixture at 80°–150° C. under isomerizing conditions until the isomerized cymene mixture contains essentially m- and p-cymene and less than about 5% o-cymene based on the total cymene content and separating the mixture from the catalyst.

4. The process for the production of a mixture of o-, m-, and p-cymene in which the o-cymene content is less than about 5% which comprises subjecting o-cymene to contact with 0.1–2 mole per cent aluminum chloride, based on the moles benzenoid materials in the reaction mixture at 80°–150° C. under iomerizing conditions until the isomerized cymene mixture contains essentially m- and p-cymene and less than about 5% o-cymene based on the total cymene content and separating the mixture from the catalyst.

5. The process for the production of a mixture of o-, m-, and p-cymene in which the o-cymene content is less than about 5% which comprises subjecting a mixture of cymene isomers containing more than 5% o-cymene to contact with 0.1–2 mole per cent aluminum chloride, based on the moles benzenoid materials in the reaction mixture at 80°–150° C. under iomerizing conditions until the isomerized cymene mixture contains essentially m- and p-cymene and less than about 5% o-cymene based on the total cymene content and separating the mixture from the catalyst.

6. The process for the production of a mixture of o-, m-, and p-cymene in which the o-cymene content is less than about 2–4% which comprises subjecting a cymene to contact with 0.1–2 mole percent aluminum chloride, based on the moles benzenoid materials in the reaction mixture at 80°–150° C. under iomerizing conditions until the isomerized cymene mixture contains essentially m- and p-cymene and less than about 2–4% o-cymene based on the total cymene content and separating the mixture from the catalyst.

7. The process for the production of a mixture of o-, m-, and p-cymene in which the o-cymene content is less than about 5% which comprises subjecting a cymene to contact with 0.3 to 0.8 mole per cent aluminum chloride, based on the moles benzenoid materials in the reaction mixture at 85°–115° C. under isomerizing conditions until the isomerized cymene mixture contains essentially m- and p-cymene and less than about 5% o-cymene based on the total cymene content and separating the mixture from the catalyst.

References Cited in the file of this patent

UNITED STATES PATENTS

| | | |
|---|---|---|
| 2,429,691 | Johnson | Oct. 28, 1947 |
| 2,527,824 | Kemp | Oct. 31, 1950 |

OTHER REFERENCES

Schorger: "Jour. Am. Chem. Soc.," vol. 39, 1917, pages 2671–9.

Braddley et al.: "Jour. Chem. Soc." (London), 1935, pages 303–309.